(12) United States Patent
Yang et al.

(10) Patent No.: US 7,359,019 B2
(45) Date of Patent: Apr. 15, 2008

(54) LIQUID CRYSTAL DISPLAY DEVICE

(75) Inventors: Chiu-Lien Yang, Miao-Li (TW); Wei-Yi Ling, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 374 days.

(21) Appl. No.: 11/142,772

(22) Filed: May 31, 2005

(65) Prior Publication Data

US 2005/0264733 A1    Dec. 1, 2005

(30) Foreign Application Priority Data

May 28, 2004  (TW) ............................. 93115290 A

(51) Int. Cl.
*G02F 1/1335* (2006.01)
(52) U.S. Cl. ..................................... 349/119
(58) Field of Classification Search ................. 349/119
See application file for complete search history.

(56) References Cited

U.S. PATENT DOCUMENTS 6,819,379 B2 * 11/2004 Kubo et al. ................. 349/114

\* cited by examiner

*Primary Examiner*—James A. Dudek
(74) *Attorney, Agent, or Firm*—Wei Te Chung

(57) ABSTRACT

An LCD device (20) includes a first substrate assembly (210), a second substrate assembly (250), a liquid crystal layer (230) having liquid crystal molecules interposed between the substrate assemblies, and alignment films (218, 258) disposed adjacent to the liquid crystal layer for making liquid crystal molecules of the liquid crystal layer align homogeneously. Each of pixel regions of the LCD device includes a reflection region and a transmission region. The LCD device further employs retardation films (261, 262, 263, 264) and compensation films (265, 266) for compensating for color in the reflection region and the transmission region of each pixel region, so as to ensure that the LCD device has a good quality display.

14 Claims, 3 Drawing Sheets

LIQUID CRYSTAL DISPLAY DEVICE

FIELD OF THE INVENTION

The present invention relates to liquid crystal display (LCD) devices, and more particularly to a reflection/transmission type LCD device capable of providing a display both in a reflection mode and a transmission mode.

BACKGROUND

Conventionally, there have been three types of LCD devices commercially available: a reflection type LCD device utilizing ambient light, a transmission type LCD device utilizing backlight, and a semi-transmission type LCD device equipped with a half mirror and a backlight.

With a reflection type LCD device, a display becomes less visible in a dim environment. In contrast, with a transmission type LCD device, a display becomes hazy in strong ambient light (e.g., outdoor sunlight). Thus researchers sought to provide an LCD device capable of functioning in both modes so as to yield a satisfactory display in any environment. In due course, a semi-transmission type LCD device was disclosed in Japanese Laid-Open Publication No. 7-333598.

However, the above-mentioned conventional semi-transmission type LCD device has the following problems.

The conventional semi-transmission type LCD device uses a half mirror in place of a reflective plate used in a reflection type LCD device, and has a minute transmission region (e.g., minute holes in a metal thin film) in a reflection region, thereby providing a display by utilizing transmitted light as well as reflected light. Since reflected light and transmitted light used for a display pass through the same liquid crystal layer, an optical path of reflected light is twice as long as that of transmitted light. This causes a large difference in retardation of the liquid crystal layer with respect to reflected light and transmitted light. Thus, a satisfactory display cannot be obtained. Furthermore, a display in a reflection mode and a display in a transmission mode are superimposed on each other, so that the respective displays cannot be separately optimized. This results in difficulty in providing a color display, and tends to cause a blurred display.

SUMMARY

In a preferred embodiment, a liquid crystal display device includes a first substrate assembly, a second substrate assembly, a liquid crystal layer having liquid crystal molecules interposed between the first and second substrate assemblies, and alignment films disposed adjacent to the liquid crystal layer. An upper polarizer, a first upper retardation film, and a first upper compensation film are orderly disposed at an outer surface of the first substrate assembly. A lower polarizer, a first lower upper retardation film, and a first lower compensation film are orderly disposed at an outer surface of the second substrate assembly. The first substrate assembly comprises a first substrate and a common electrode, with the common electrode being disposed at an inner surface of the first substrate. The first substrate assembly comprises a second substrate and a pixel electrode, with the pixel electrode being disposed at an inner surface of the second substrate.

The liquid crystal display device includes a plurality of pixel regions. Each of the pixel regions defines a reflection region and a transmission region.

In such kind of LCD device, the retardation films and compensation films compensate for color in the reflection region and the transmission region of each of the pixel regions. This helps ensure that the LCD device provides a good quality display. In addition, the alignment films disposed adjacent to the liquid crystal layer make liquid crystal molecules in the liquid crystal layer align homogeneously.

Other advantages and novel features will become more apparent from the following detailed description when taken in conjunction with the accompanying drawings.

DETAILED DESCRIPTION OF PREFERRED EMBODIMENTS

Figure 1:
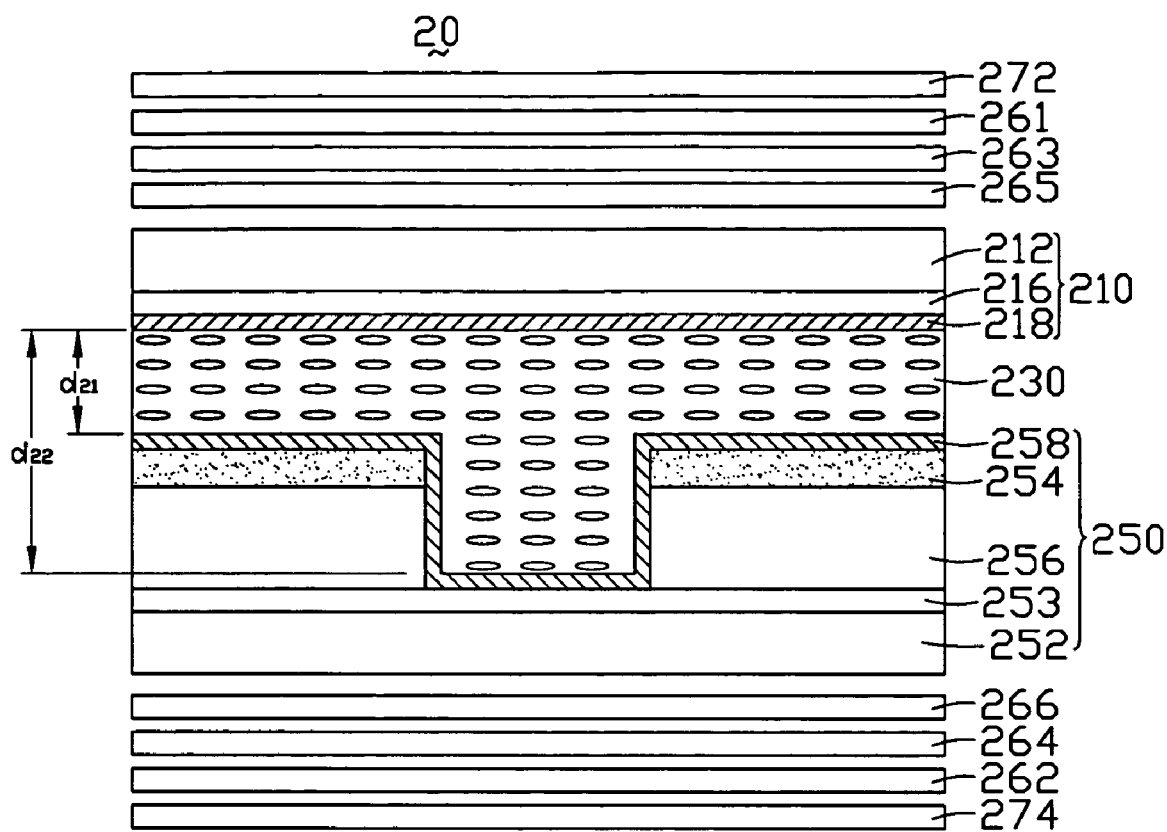
FIG. 1 is a schematic, exploded, side cross-sectional view of part of an LCD device according to a first embodiment of the present invention.

FIG. 1 is a schematic, exploded, side cross-sectional view of part of an LCD device 20 according to a first embodiment of the present invention. The LCD device 20 includes a first substrate assembly 210, a second substrate assembly 250 disposed parallel to and spaced apart from the first substrate assembly 210, and a liquid crystal layer 230 having liquid crystal molecules (not labeled) sandwiched between the substrate assemblies 210 and 250.

A first upper compensation film 265, a first upper retardation film 263, a second upper retardation film 261, and an upper polarizer 272 are orderly disposed on an outer surface of the first substrate assembly 210. A first lower compensation film 266, a first lower retardation film 264, a second lower retardation film 262, and a lower polarizer 274 are orderly disposed on an outer surface of the second substrate assembly 250.

The first substrate assembly 210 includes a transparent substrate 212, a transparent common electrode 216, and an upper alignment film 218. The common electrode 216 and the upper alignment film 218 are orderly disposed on an inner surface of the transparent substrate 212.

The second substrate assembly 250 includes a transparent substrate 252, a pixel electrode 253, a plurality of reflection electrodes 254, a transparent insulating layer 256, and a lower alignment film 258. The pixel electrode 253 is disposed on an inner surface of the transparent substrate 252. The pixel electrode 253 is made of a transparent conductive material, such as indium-tin-oxide (ITO) or indium-zinc-oxide (IZO). The transparent insulating layer 256 is disposed on the pixel electrode 253, and generally comprises separated portions. A plurality of reflection electrodes 254 is disposed between the lower alignment film 258 and the portions of the transparent insulating layer 256. The reflection electrodes 254 are made of metal with a high reflective ratio, such as Al or an Al-Nd alloy. The reflection electrodes 254 are used for reflecting ambient light when the LCD device 20 operates in a reflection mode. The lower alignment film 258 is attached on the pixel electrode 253 and the reflection electrodes 254.

The alignment films 218 and 258 are used to ensure that liquid crystal molecules in the liquid crystal layer 230 align homogeneously.

The LCD device 20 includes a plurality of pixel regions that span through the common electrode 216, the pixel electrode 253, and the liquid crystal layer 230 contained between the common and pixel electrodes 216, 253. Each of the pixel regions includes a reflection region (not labeled) corresponding to the reflection electrodes 254 on the portions of the transparent insulating layer 256, and a transmission region (not labeled) corresponding to one or more gaps between the portions of the transparent insulating layer 256. The liquid crystal layer 230 has a thickness d21 in the reflection region, and has a thickness d22 in the transmission region. D22 is larger than d21. In this embodiment, d21 is substantially half of d22.

The first upper and lower compensation films 265 and 266 are discotic molecular films. The first upper and lower retardation films 263 and 264 are half-wave plates. The second upper and lower retardation films 261 and 262 are quarter-wave plates.

Figure 2:
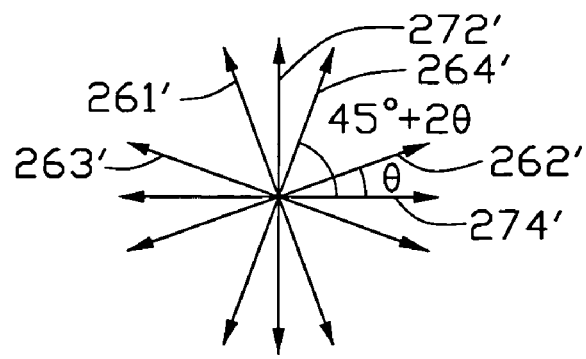
FIG. 2 is a schematic, plan view of polarizing directions of polarizers and retardation films of the LCD device of FIG. 1.

Also referring to FIG. 2, the lower polarizer 274 has a horizontal polarizing axis 274', and the upper polarizer 272 has a polarizing axis 272' perpendicular to the polarizing axis 274'. The second lower retardation film 262 has an optical axis 262', and the second upper retardation film 261 has an optical axis 261' perpendicular to the optical axis 262'. The optical axis 262' maintains an angle θ relative to the polarizing axis 274'. The angle θ is in a range of either 8° to 22°, or 68° to 82°. In this embodiment, θ is 10°. The first lower retardation film 264 has an optical axis 264', and the first upper retardation film 263 has an optical axis 263' perpendicular to the optical axis 264'. The optical axis 264' maintains an angle of 2θ°±45° relative to the polarizing axis 274' of the lower polarizer 274.

The first upper and lower compensation films 265 and 266 are biaxial compensation films. A phase retardation relation of the first upper compensation film 265 and the liquid crystal layer 230 in the reflection regions is represented by the following formulae:

$$Ret_{LCR}(V_{Off}) - Ret_{LCR}(V_{On}) = \lambda/4 \pm m(\lambda/2), m=0, 1, 2, \ldots$$

$$Ret_{LCR}(V_{On}) + Ret_{F265} = m(\lambda/2), m=0, 1, 2, \ldots$$

where $Ret_{LCR}(V_{Off})$ is the phase retardation of the liquid crystal layer 230 in the reflection regions in an on-state of the LCD device 20, $Ret_{LCR}(V_{On})$ is the phase retardation of the liquid crystal layer 230 in the reflection regions in an off-state of the LCD device 20, and $Ret_{F265}$ is the phase retardation of the first upper compensation film 265.

The phase retardations of the first upper and lower compensation films 265 and 266 and the liquid crystal layer 230 in the transmission regions are represented by the following formulae:

$$Ret_{LCT}(V_{Off}) - Ret_{LCT}(V_{On}) = \lambda/2 \pm m\lambda, m=0, 1, 2, \ldots$$

$$Ret_{LCT}(V_{On}) + Ret_{F265} + Ret_{F266} = m\lambda, m=0, 1, 2, \ldots$$

where $Ret_{LCT}(V_{Off})$ is the phase retardation of the liquid crystal layer 230 in the transmission regions in an on-state of the LCD device 20, $Ret_{LCT}(V_{On})$ is the phase retardation of the liquid crystal layer 230 in the reflection regions in an off-state of the LCD device 20, and $Ret_{F265}$ and $Ret_{F266}$ are the phase retardations of the first upper and lower compensation films 265 and 266 respectively. In this embodiment, $$Ret_{LCR}(0V) - Ret_{LCR}(3.7V) = \lambda/4$$

$$Ret_{LCR}(3.7V) + Ret_{F265} = 0$$

$$Ret_{LCT}(0V) - Ret_{LCT}(3.7V) = \lambda/2$$

$$Ret_{LCT}(3.7V) + Ret_{F265} + Ret_{F266} = 0$$

Figure 3:
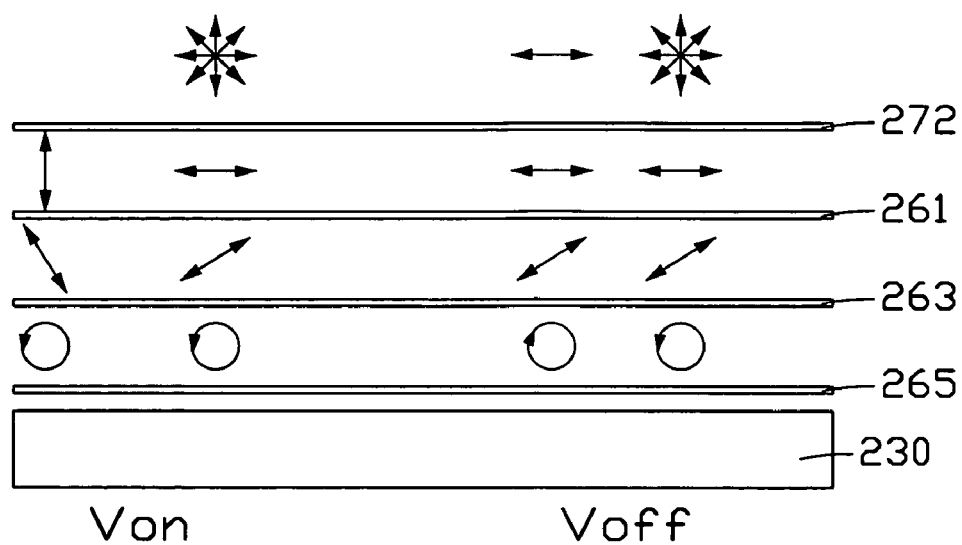
FIG. 3 shows a polarized state of light in each of certain layers of the LCD device of FIG. 1, in respect of an on-state (white state) and an off-state (black state) of the LCD device, when the LCD device operates in a reflection mode.

FIG. 3 shows a polarized state of light in each of certain layers of the LCD device 20, in respect of an on-state (white state) and an off-state (black state) of the LCD device 20, when the LCD device 20 operates in a reflection mode. When no voltage is applied to the LCD device 20, the LCD device 20 is in an on-state. Ambient incident light becomes linearly-polarized light having a polarizing direction 272' after passing through the upper polarizer 272. Then the linearly-polarized light passes through the second upper retardation film 261 (a half-wave plate). The polarized state of the linearly-polarized light is not changed, and the polarizing direction thereof twists by an amount of 2θ. Thereafter, the linear-polarized light is incident upon the first upper retardation film 263 (a quarter-wave plate), and becomes circularly-polarized light. Then the circularly-polarized light passes through the first upper compensation film 265 and is incident on the liquid crystal layer 230. Since an effective phase difference of the liquid crystal layer 230 in an on-state is adjusted to a wavelength of λ/4 in order to obtain a white display, the incident circularly-polarized light becomes linearly-polarized light. The linearly-polarized light exiting the liquid crystal layer 230 is reflected by the reflection electrodes 254. The linearly-polarized light keeps its polarized state, and is incident on the liquid crystal layer 230 again. The linearly-polarized light passing through the liquid crystal layer 230 becomes circularly-polarized light having a polarizing direction opposite to that of the circularly-polarized light originally incident on the liquid crystal layer 230. The circularly-polarized light exiting the liquid crystal layer 230 is converted to linearly-polarized light by the quarter-wave plate 263. Thereafter, the linearly-polarized light passes through the half-wave plate 261, and is output through the upper polarizer 272 for displaying images.

On the other hand, when a voltage is applied to the LCD device 20, the LCD device 20 is in an off-state. Up to the point where ambient incident light reaches the liquid crystal layer 230, the ambient incident light undergoes transmission in substantially the same way as described above in relation to the LCD device 20 being in the on-state. Since an effective phase difference of the liquid crystal layer 230 is adjusted to be 0 by applying a voltage in order to obtain a black display, the circularly-polarized light incident on the liquid crystal layer 230 passes therethrough as circularly-polarized light. The circularly-polarized light exiting the liquid crystal layer 230 is reflected by the reflection electrodes 254. The circularly-polarized light keeps its polarized state, and is incident on the liquid crystal layer 230 again. After passing through the liquid crystal layer 230, the circularly-polarized light is converted into linearly-polarized light by the first upper retardation film 263 (a quarter-wave plate). At this time, the polarizing direction of the linearly-polarized light is rotated by about 90° compared with that of a white display state. Then the linearly-polarized light passes through the second upper polarized film 261 (a half-wave plate), and is absorbed by the upper polarizer 272. Thus the linearly-polarized light is not output from the LCD device 20 for displaying images.

Figure 4:
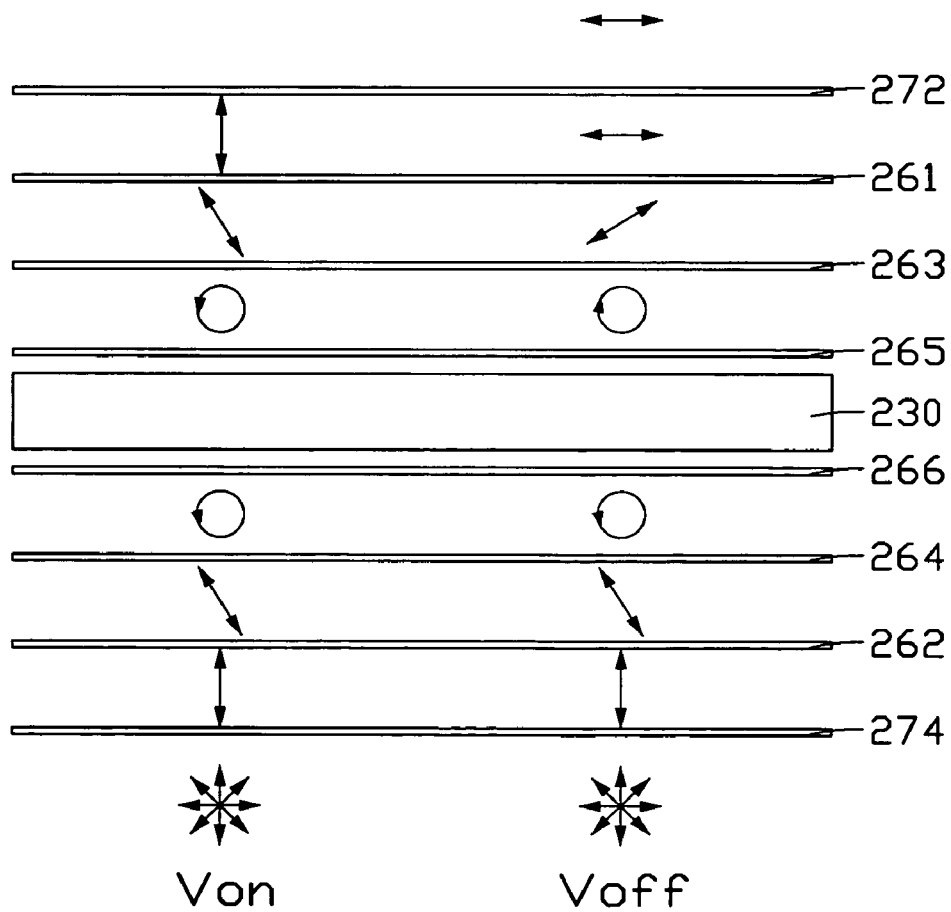
FIG. 4 shows a polarized state of light in each of certain layers of the LCD device of FIG. 1, in respect of an on-state (white state) and off-state (black state) of the LCD device, when the LCD device operates in a transmission mode.

FIG. 4 shows a polarized state of light in each of certain layers of the LCD device 20, in respect of an on-state (white state) and an off-state (black state) of the LCD device 20, when the LCD device 20 operates in a transmission mode. Incident light undergoes transmission in a manner similar to that described above in relation to the LCD device 20 operating in the reflection mode.

In each pixel region of the LCD device 20, the liquid crystal molecules have a pre-tilt angle, which ensures that the liquid crystal molecules can more easily twist when a voltage is applied thereto. Thereby, the LCD device 20 has a fast response time. Moreover, the retardation films and compensation films are used for compensating for color, so as to ensure that the LCD device 20 has a good quality display.

Figure 5:
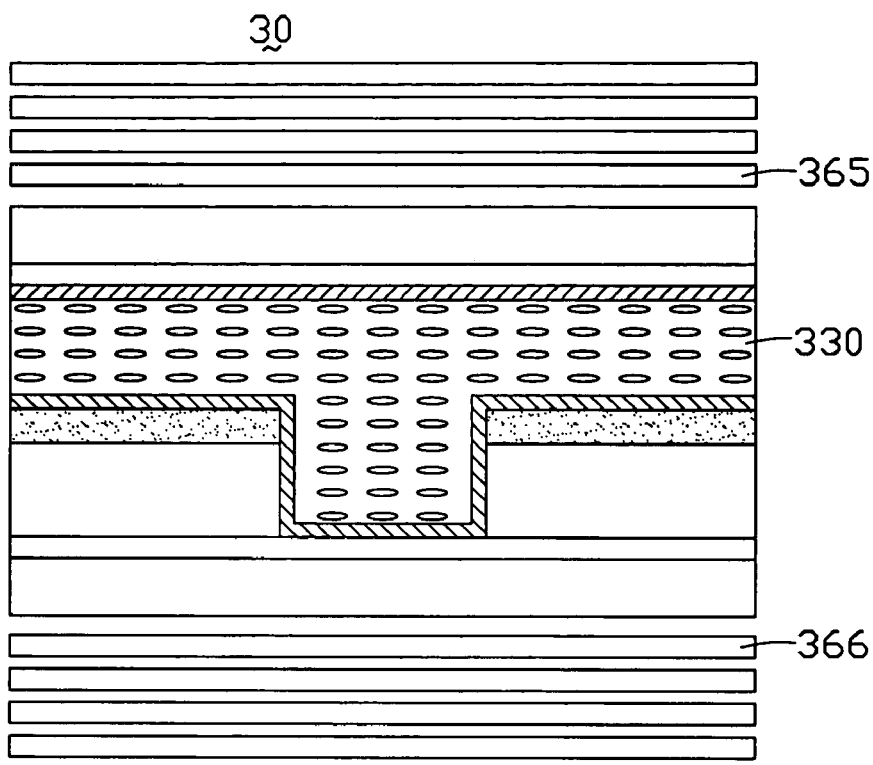
FIG. 5 is a schematic, exploded, side cross-sectional view of part of an LCD device according to a second embodiment of the present invention.

FIG. 5 is a schematic, exploded, side cross-sectional view of part of an LCD device 30 according to a second embodiment of the present invention. The LCD device 30 has a structure similar to the LCD device 20. However, the LCD device 30 includes first upper and lower compensation films 365 and 366, which are single axis compensation films, such as A-plate compensation films or discotic molecular films.

The phase retardation relation of the first upper compensation film 365 and a liquid crystal layer 330 in the reflection regions is represented by the following formulae:

$$Ret_{LCR}(V_{Off}) - Ret_{LCR}(V_{On}) = \lambda/4 \pm m(\lambda/2),\ m=0, 1, 2, \ldots$$

$$Ret_{LCR}(V_{On}) + Ret_{F365} = \pm m(\lambda/2),\ m=0, 1, 2, \ldots$$

where $Ret_{LCR}(V_{Off})$ is the phase retardation of the liquid crystal layer 330 in the reflection regions in an on-state, $Ret_{LCR}(V_{On})$ is the phase retardation of the liquid crystal layer 330 in the reflection regions in an off-state, and $Ret_{F365}$ is the phase retardation of the first upper compensation film 365.

The phase retardations of the first upper and lower compensation films 365 and 366 and the liquid crystal layer 330 in the transmission regions are represented by the following formulae:

$$Ret_{LCT}(V_{Off}) - Ret_{LCT}(V_{On}) = \lambda/2 \pm m\lambda,\ m=0, 1, 2, \ldots$$

$$Ret_{LCT}(V_{On}) + Ret_{F365} + Ret_{F366} = \pm m\lambda,\ m=0, 1, 2, \ldots$$

where $Ret_{LCT}(V_{Off})$ is the phase retardation of the liquid crystal layer 330 in the transmission regions in an on-state, $Ret_{LCT}(V_{On})$ is the phase retardation of the liquid crystal layer 330 in the reflection regions in an off-state, and $Ret_{F365}$ and $Ret_{F366}$ are the phase retardations of the first upper and lower compensation films 365 and 366 respectively. In this embodiment, $$Ret_{LCR}(0V) - Ret_{LCR}(4V) = \lambda/4$$

$$Ret_{LCR}(4V) + Ret_{F365} = 0$$

$$Ret_{LCT}(0V) - Ret_{LCT}(4V) = \lambda/2$$

$$Ret_{LCT}(4V) + Ret_{F365} + Ret_{F366} = 0$$

Figure 6:
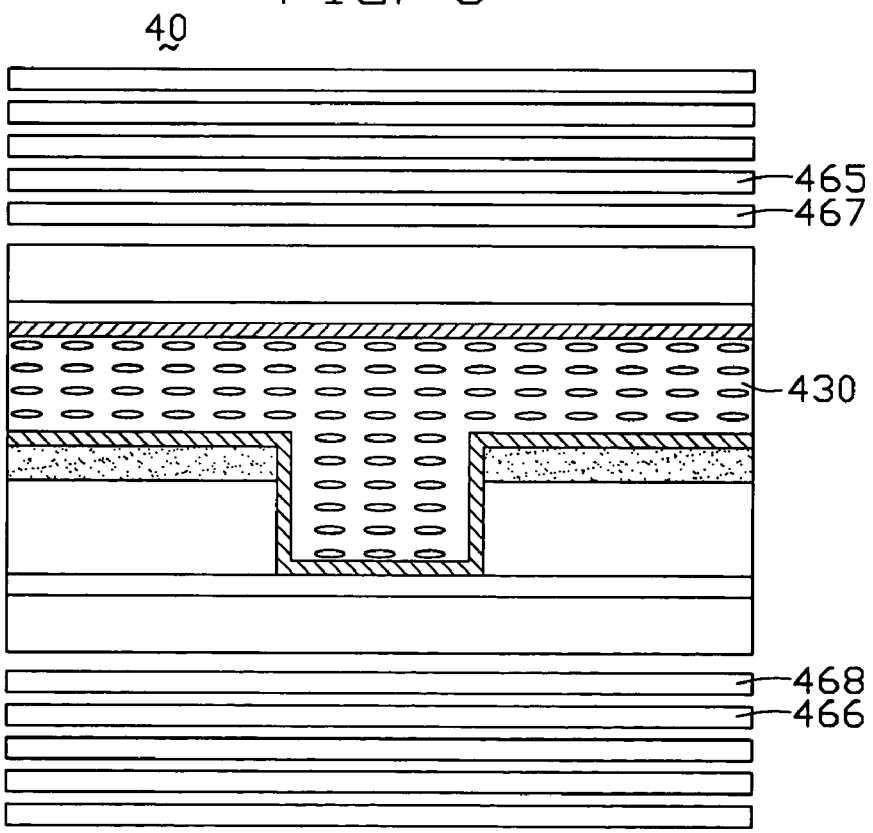
FIG. 6 is a schematic, exploded, side cross-sectional view of part of an LCD device according to a third embodiment of the present invention.

FIG. 6 is a schematic, exploded, side cross-sectional view of part of an LCD device 40 according to a third embodiment of the present invention. The LCD device 40 has a structure similar to the LCD device 30. However, the LCD device 40 includes first upper and lower compensation films 465 and 466, and second upper and lower compensation films 467 and 468, which are single axis compensation films. The first upper and lower compensation films 465 and 466 are A-plate compensation films. The second upper and lower compensations films 467 and 468 are discotic molecular films.

The phase retardation relation of the first and second upper compensation films 465 and 467 and the liquid crystal layer 430 in the reflection regions is represented by the following formulae:

$$Ret_{LCR}(V_{Off}) - Ret_{LCR}(V_{On}) = \lambda/4 \pm m(\lambda/2),\ m=0, 1, 2, \ldots$$

$$Ret_{LCR}(V_{On}) + Ret_{F465} + Ret_{F467} = m\lambda,\ m=0, 1, 2, \ldots$$

where $Ret_{LCR}(V_{Off})$ is the phase retardation of the liquid crystal layer 430 in the reflection regions in an on-state, $Ret_{LCR}(V_{On})$ is the phase retardation of the liquid crystal layer 430 in the reflection regions in an off-state, and $Ret_{F465}$ and $Ret_{F467}$ are the phase retardations of the first and second upper compensation films 465 and 467, respectively.

The phase retardations of the first upper and lower and the second upper and lower compensation films 465, 466, 467 and 468 and the liquid crystal layer 430 in the transmission regions are represented by the following formulae:

$$Ret_{LCT}(V_{Off}) - Ret_{LCT}(V_{On}) = \lambda/2 \pm m\lambda,\ m=0, 1, 2, \ldots$$

$$Ret_{LCT}(V_{On}) + Ret_{F465} + Ret_{F466} + Ret_{F467} + Ret_{F468} = m\lambda,\ m=0, 1, 2, \ldots$$

where $Ret_{LCT}(V_{Off})$ is the phase retardation of the liquid crystal layer 430 in the transmission regions in an on-state, $Ret_{LCT}(V_{On})$ is the phase retardation of the liquid crystal layer 430 in the reflection regions in an off-state, and $Ret_{F465}$, $Ret_{F466}$, $Ret_{F467}$ and $Ret_{F468}$ are the phase retardations of the first upper and lower and second upper and lower compensation films 465, 466, 467 and 468 respectively. In this embodiment, $$Ret_{LCR}(0V) - Ret_{LCR}(3V) = \lambda/4$$

$$Ret_{LCR}(3V) + Ret_{F465} + Ret_{F467} = 0$$

$$Ret_{LCT}(0V) - Ret_{LCT}(3V) = \lambda/2$$

$$Ret_{LCT}(3V) + Ret_{F465} + Ret_{F466} + Ret_{F467} + Ret_{F468} = 0$$

Various modifications and alterations are possible within the ambit of the invention herein. For example, the compensation films may be biaxial compensation films, single compensation films, A-plate compensation films, or discotic molecular films. Moreover, the LCD device may only employ a single upper retardation film and a single lower retardation film for compensating color. Furthermore, the LCD device may only employ a compensation film disposed on one of the substrates. In addition, any or all the retardation films and compensation films may be disposed on inner surfaces of either of the first and second substrate assemblies, adjacent to the liquid crystal layer.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a first substrate and a second substrate;
   a liquid crystal layer having liquid crystal molecules interposed between the first and second substrates;
   alignment films disposed adjacent to the liquid crystal layer for making the liquid crystal molecules align homogeneously;
   a first polarizer provided at the first substrate;
   a first upper retardation film disposed between the first polarizer and the liquid crystal layer, the first upper retardation film being a quarter-wave plate;
   a first upper compensation film disposed between the first upper retardation film and the liquid crystal layer;
   a common electrode disposed at an inner surface of the first substrate;
   a pixel electrode disposed at an inner surface of the second substrate;
   a plurality of pixel regions, each of the pixel regions including a reflection region and a transmission region;
   a second polarizer provided under the second substrate;
   a first lower retardation film disposed between the second polarizer and the liquid crystal layer, the first lower retardation film being a quarter-wave plate; and
   a first lower compensation film disposed between the first lower retardation film and the liquid crystal layer;
   wherein the first upper and lower compensation films are biaxial compensation films;
   wherein a phase retardation relation of the first upper compensation film and the liquid crystal layer in the reflection regions is represented by the following formulae:

$Ret_{LCR}(V_{Off}) - Ret_{LCR}(V_{On}) = \lambda/4 \pm m(\lambda/2)$, $m=0, 1, 2, ..$ $Ret_{LCR}(V_{On}) + Ret_{F1} = m(\lambda/2)$, $m=0, 1, 2, ...$ where $Ret_{LCR}(V_{Off})$ is the phase retardation of the liquid crystal layer in the reflection regions in an on-state, $Ret_{LCR}(V_{On})$ is the phase retardation of the liquid crystal layer in the reflection regions in an off-state, and $Ret_{F1}$ is the phase retardation of the first upper compensation film.

2. The liquid crystal display device as claimed in claim 1, wherein phase retardations of the first upper and lower compensation films and the liquid crystal layer in the transmission regions are represented by the following formulae:

$Ret_{LCT}(V_{Off}) - Ret_{LCT}(V_{On}) = \lambda/2 \pm m\lambda$, $m=0, 1, 2, ...$ $Ret_{LCT}(V_{On}) + Ret_{F1} \ Ret_{F2} = m\lambda$, $m=0, 1, 2, ...$ where $Ret_{LCT}(V_{On})$ is the phase retardation of the liquid crystal layer in the transmission regions in an on-state, $Ret_{LCT}(V_{On})$ is the phase retardation of the liquid crystal layer in the reflection regions in an off-state, and $Ret_{F1}$ and $Ret_{F2}$ are the phase retardations of the first upper and lower compensation films.

3. The liquid crystal display device as claimed in claim 2, wherein the upper polarizer has a polarizing axis perpendicular to a polarizing axis of the lower polarizer.

4. The liquid crystal display device as claimed in claim 3, wherein the first upper retardation film has an optical axis perpendicular to an optical axis of the first lower retardation film.

5. The liquid crystal display device as claimed in claim 4, further comprising a second upper retardation film disposed between the first upper retardation film and the upper polarizer, and a second lower retardation film disposed between the first lower retardation film and the lower polarizer, wherein the second upper and lower retardation films are half-wave plates.

6. The liquid crystal display device as claimed in claim 5, wherein the second upper retardation film has an optical axis perpendicular to an optical axis of the second lower retardation film.

7. The liquid crystal display device as claimed in claim 6, wherein the optical axis of the second lower retardation film maintains an angle $\theta$ relative to the polarizing axis of the second polarizer.

8. The liquid crystal display device as claimed in claim 7, wherein $\theta$ is in a range of 8° to 22° or in a range of 68° to 82°.

9. The liquid crystal display device as claimed in claim 8, wherein the optical axis of the first lower retardation film maintains an angle of $2\theta \pm 45°$ relative to the polarizing axis of the second polarizer.

10. A liquid crystal display device, comprising:
    a first substrate and a second substrate;
    a liquid crystal layer having liquid crystal molecules interposed between the first and second substrates;
    alignment films disposed adjacent to the liquid crystal layer for making the liquid crystal molecules align homogeneously;
    a first polarizer provided at the first substrate;
    a first upper retardation film disposed between the first polarizer and the liquid crystal layer, the first upper retardation film being a quarter-wave plate;
    a first upper compensation film disposed between the first upper retardation film and the liquid crystal layer;
    a common electrode disposed at an inner surface of the first substrate;
    a pixel electrode disposed at an inner surface of the second substrate;
    a plurality of pixel regions, each of the pixel regions including a reflection region and a transmission region;
    a second polarizer provided under the second substrate;
    a first lower retardation film disposed between the second polarizer and the liquid crystal layer, the first lower retardation film being a quarter-wave plate; and
    a first lower compensation film disposed between the first lower retardation film and the liquid crystal layer;
    wherein the first upper and lower compensation films are single axis compensation films;
    wherein a phase retardation of the first upper compensation film and the liquid crystal layer in the reflection regions is represented by the following formulae:

$Ret_{LCR}(V_{Off}) - Ret_{LCR}(V_{On}) = \lambda/4 \pm m(\lambda/2)$, $m=0, 1, 2, ..$ $Ret_{LCR}(V_{On}) + Ret_{F1} = \pm m(\lambda/2)$, $m=0, 1, 2, ...$ where $Ret_{LCR}(V_{Off})$ is the phase retardation of the liquid crystal layer in the reflection regions in an on-state, $Ret_{LCR}(V_{On})$ is the phase retardation of the liquid crystal layer in the reflection regions in an off-state, and $Ret_{F1}$ is the phase retardation of the first upper compensation film.

11. The liquid crystal display device as claimed in claim 10, wherein phase retardations of the first upper and lower compensation films and the liquid crystal layer in the transmission regions are represented by the following formulae:

$Ret_{LCT}(V_{Off}) - Ret_{LCT}(V_{On}) = \lambda/2 \pm m\lambda$, $m=0, 1, 2, ...$ $Ret_{LCT}(V_{On}) + Ret_{F1} + Ret_{F2} = \pm m\lambda$, $m=0, 1, 2, ...$ where $\text{Ret}_{LCT}(V_{Off})$ is the phase retardation of the liquid crystal layer in the transmission regions in an on-state, $\text{Ret}_{LCT}(V_{On})$ is the phase retardation of the liquid crystal layer in the reflection regions in an off-state, and $\text{Ret}_{F1}$ and $\text{Ret}_{F2}$ are the phase retardations of the first upper and lower compensation films.

12. The liquid crystal display device as claimed in claim 11, further comprising a second upper compensation film disposed between the first upper compensation film and the liquid crystal layer, and a second lower compensation film disposed between the first lower compensation film and the liquid crystal layer.

13. The liquid crystal display device as claimed in claim 12, wherein phase retardations of the first and second upper compensation films and the liquid crystal layer in the reflection regions are represented by the following formulae:

$$\text{Ret}_{LCR}(V_{Off}) - \text{Ret}_{LCR}(V_{On}) = \lambda/4 \pm m(\lambda/2), \; m=0, 1, 2, \ldots$$

$$\text{Ret}_{LCR}(V_{On}) + \text{Ret}_{F1} + \text{Ret}_{F3} = m(\lambda/2), \; m=0, 1, 2, \ldots$$

where $\text{Ret}_{LCR}(V_{On})$ is the phase retardation of the liquid crystal layer in the reflection regions in an on-state, $\text{Ret}_{LCR}(V_{On})$ is the phase retardation of the liquid crystal layer in the reflection regions in an off-state, $\text{Ret}_{F1}$ is the phase retardation of the first upper compensation film, and $\text{Ret}_{F3}$ is the phase retardation of the second upper compensation film.

14. The liquid crystal display device as claimed in claim 13, wherein phase retardations of the first upper and lower compensation films, the second upper and lower compensation films, and the liquid crystal layer in the transmission regions are represented by the following formulae:

$$\text{Ret}_{LCT}(V_{Off}) - \text{Ret}_{LCT}(V_{On}) = \lambda/2m\lambda, \; m=0, 1, 2, \ldots$$

$$\text{Ret}_{LCT}(V_{On}) + \text{Ret}_{F1} + \text{Ret}_{F2} + \text{Ret}_{F3} + \text{Ret}_{F4} = m\lambda, \; m=0, 1, 2, \ldots$$

where $\text{Ret}_{LCT}(V_{Off})$ is the phase retardation of the liquid crystal layer in the transmission regions in an on-state, $\text{Ret}_{LCT}(V_{On})$ is the phase retardation of the liquid crystal layer in the reflection regions in an off-state, $\text{Ret}_{F1}$, and $\text{Ret}_{F2}$ are the phase retardations of the first upper and lower compensation films, and $\text{Ret}_{F3}$ and $\text{Ret}_{F4}$ are the phase retardations of the second upper and lower compensation films.

* * * * *